Nov. 8, 1949  G. M. MAST  2,487,459
STEREOSCOPIC PICTURE DISK AND VIEWER THEREFOR
Filed May 6, 1947

INVENTOR.
G. M. MAST
BY
Merrill M. Blackburn

Patented Nov. 8, 1949

2,487,459

UNITED STATES PATENT OFFICE 2,487,459

STEREOSCOPIC PICTURE DISK AND VIEWER THEREFOR

Gifford M. Mast, Davenport, Iowa, assignor to Mast Development Company, Inc., Davenport, Iowa, a corporation of Iowa Application May 6, 1947, Serial No. 746,391

1 Claim. (Cl. 88—29)

The present invention relates to picture discs of the general type shown in Gruber Patent No. 2,189,285, issued February 6, 1940, and to a viewing apparatus for viewing the same.

In view of the fact that the pupillary distance necessarily limits the distance between the viewing lenses of the viewing apparatus, the diameter of the picture disc is necessarily limited. This limits the number of pictures which can be placed side by side around the edge of the disc for viewing purposes, since, in order to get stereoscopic effect, it is necessary that there be a pair of pictures properly placed with relation to each other. Hence, we find that in the Gruber disc there are only half as many stereoscopic pairs as the total number of pictures mounted on the disc. It is therefore the principal object of this invention to increase the number of stereoscopic pairs of pictures which can be mounted upon the cards used in the viewer. This is accomplished by having an inner circle of pictures and an outer circle of pictures properly positioned with relation to each other and properly positioned in the viewer apparatus so that the inner pictures are viewed by one eye and the outer pictures by the other eye. This is accomplished by having a pivot about which the card turns, eccentrically mounted with relation to the viewer lenses so that, as the card rotates, one circle of pictures will come in front of the left eye and the other in front of the right eye.

In the drawings annexed hereto and forming a part hereof,

Figure 1:
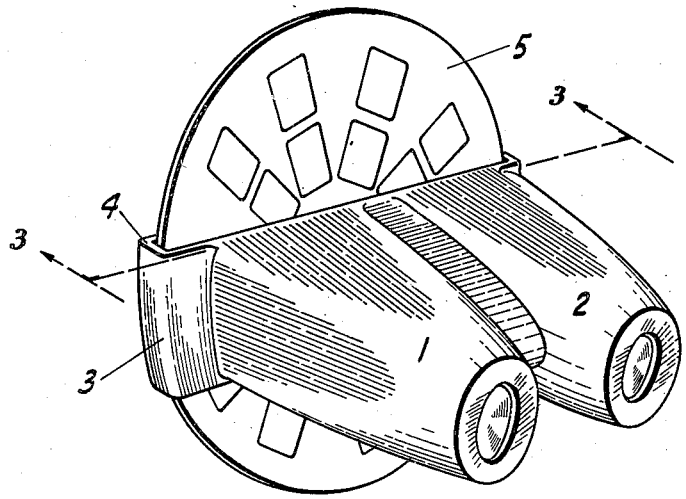
Figure 1 is a perspective view of a viewer with a card for the mounting of stereoscopic views supported therein in position to be viewed.
Figure 2:
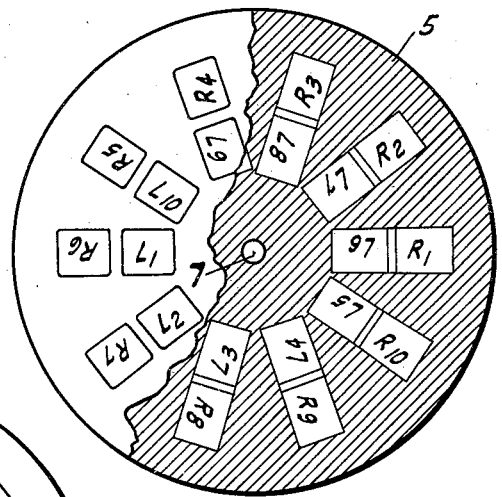
Figure 2 is a face view of a card for use in such a viewer, part of the cover disc being removed.
Figure 3:
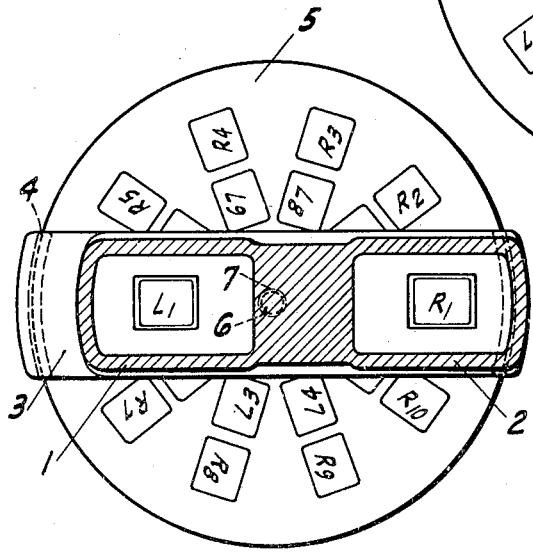
Figure 3 represents a transverse section substantially along the plane indicated by the line 3—3, Fig. 1, and showing the positioning of the pivot pin for the mounting of the picture disc.

Reference will now be made in greater detail to the annexed drawings for a more complete description of this invention. In Fig. 1, the two lens-supporting tubes are shown at 1 and 2 and these are connected to a frame 3 having a slot 4 therethrough for the reception of the picture disc 5. It is clear that if the pivot pin about which the picture disc turns is spaced equally from the axes of the tubes 1 and 2, then the pictures must be mounted on the card in a single circle, as in the Gruber device. However, by placing the pivot pin to one side or the other of the vertical medial plane a proper distance, as shown in Fig. 3, where the pivot pin 6 is shown as being offset with relation to the visual lines of the viewing tubes, it is possible to view the pictures of the outer circle with the right eye and the pictures of the inner circle with the left eye. In Fig. 2, the pictures viewed by the right eye are indicated by the letter R with a subscript numeral, and the corresponding stereoscopic pictures to be viewed by the left eye are indicated by the letter L with a corresponding subscript numeral. Thus, picture $R_1$ is viewed simultaneously with picture $L_1$. Similarly, $R_2$ and $L_2$ are viewed simultaneously by the two eyes, and so on around the disc.

It follows from the structure and arrangement described in the foregoing that the number-limiting factor is the number of pictures which can be placed in the inner circle, and this is shown in Fig. 2 as being ten. The corresponding number of pictures viewed by the right eye will be the same, although they will be spaced farther apart. Hence, with this arrangement, it is possible to get ten pairs of stereoscopic views on a card as compared with seven by the Gruber arrangement. This comes about, as indicated above, from the fact that the disc 5 is offset laterally with relation to the medial plane of the viewer so that the R pictures appear in front of the No. 2 viewing tube while the L pictures appear in front of the No. 1 viewing tube, the pictures being placed concentrically about the opening 7 at the center of the card 5 through which the pivot pin 6 passes and about which the card rotates.

It is of course understood that the specific description of structure set forth above may be departed from without departing from the spirit of this invention as disclosed in this specification and as defined by the appended claim.

Having now described my invention, I claim:

A structure for the purpose described comprising a viewer having a pair of viewer tubes and lenses, a body to which said tubes are connected, said body having an opening for the reception of a stereoscopic view card, a card having stereoscopic pictures arranged in two concentric circles, there being an opening through said card for reception of a pivot pin, and a pivot pin in said body passing through the opening in the view card, said pin being eccentrically positioned whereby to position the pictures of one circle in line with one viewer tube and the pictures of the other circle in line with the other viewer tube.

GIFFORD M. MAST.

REFERENCES CITED

The following references are of record in the file of this patent:

UNITED STATES PATENTS

| Number | Name | Date |
| --- | --- | --- |
| 869,733 | Rosenfeld | Oct. 29, 1907 |
| 1,504,989 | Spitzer | Aug. 12, 1924 |
| 2,189,285 | Gruber | Feb. 6, 1940 |

FOREIGN PATENTS

| Number | Country | Date |
| --- | --- | --- |
| 683,292 | Germany | Nov. 3, 1939 |